United States Patent
Wiles (10) Patent No.: US 12,272,118 B2
(45) Date of Patent: Apr. 8, 2025

(54) CLASSIFYING PRESSURE INPUTS

(71) Applicant: Peratech IP Ltd., North Yorkshire (GB)

(72) Inventor: Timothy Peter Wiles, North Yorkshire (GB)

(73) Assignee: Peratech IP Ltd, North Yorkshire (GB)

( * ) Notice: Subject to any disclaimer, the term of this patent is extended or adjusted under 35 U.S.C. 154(b) by 441 days.

(21) Appl. No.: 17/880,721

(22) Filed: Aug. 4, 2022

(65) Prior Publication Data

US 2022/0375201 A1    Nov. 24, 2022

Related U.S. Application Data

(63) Continuation of application No. PCT/GB2021/000009, filed on Feb. 3, 2021.

(30) Foreign Application Priority Data

Feb. 4, 2020  (GB) ..................................... 2001544

(51) Int. Cl.
| | | |
|---|---|---|
| *G06V 10/764* | (2022.01) | |
| *G06V 10/75* | (2022.01) | |
| *G06V 10/77* | (2022.01) | |
| *G06V 10/82* | (2022.01) | |

(52) U.S. Cl.
CPC .......... *G06V 10/764* (2022.01); *G06V 10/751* (2022.01); *G06V 10/7715* (2022.01); *G06V 10/82* (2022.01)

(58) Field of Classification Search
CPC ............... G06V 10/764; G06V 10/751; G06V 10/7715; G06V 10/82; G06F 3/04144; G06F 3/0488; G06F 3/0416; G06F 2203/04104
See application file for complete search history.

(56) References Cited

U.S. PATENT DOCUMENTS

| | | |
|---|---|---|
| 2012/0056846 A1 | 3/2012 | Zaliva |
| 2012/0158629 A1* | 6/2012 | Hinckley ............ G06F 3/04186 345/173 |
| 2012/0262407 A1 | 10/2012 | Hinckley et al. |

(Continued)

FOREIGN PATENT DOCUMENTS

| | | |
|---|---|---|
| WO | 2016007450 A1 | 1/2016 |
| WO | 2018125347 A1 | 7/2018 |

OTHER PUBLICATIONS

Corresponding Great Britain Patent Application No. GB2001544.2, Search Report dated Jul. 23, 2020, 1 page.

(Continued)

*Primary Examiner* — Fayyaz Alam
(74) *Attorney, Agent, or Firm* — Cooper Legal Group LLC (57) ABSTRACT

A method of classifying pressure inputs in a sensing array, in which the sensing array comprises a plurality of sensing elements responsive to pressure inputs is described. The method comprises steps of identifying a plurality of pressure inputs in the sensing array and converting the plurality of pressure inputs into an output image. The output image is compared with a data set comprising a plurality of images of undesirable pressure inputs by means of an artificial neural network. A mask is applied which is consistent with the output image to remove undesirable pressure inputs.

17 Claims, 9 Drawing Sheets

(56) References Cited

U.S. PATENT DOCUMENTS

| | | | |
|---|---|---|---|
| 2013/0176270 A1 | 7/2013 | Cattivelli et al. | |
| 2016/0012348 A1* | 1/2016 | Johnson | G06N 20/20 |
| | | | 706/12 |
| 2018/0088786 A1* | 3/2018 | Abzarian | G06F 3/04186 |
| 2018/0157371 A1* | 6/2018 | Harrison | G06F 3/04186 |
| 2018/0181245 A1* | 6/2018 | Beck | G06F 3/04883 |
| 2018/0188938 A1* | 7/2018 | Deselaers | G06F 3/04883 |
| 2019/0129526 A1* | 5/2019 | Cheng | G06F 3/041 |
| 2019/0258353 A1* | 8/2019 | Drumm | G06F 3/0416 |
| 2020/0012382 A1* | 1/2020 | Lee | G06N 3/08 |
| 2020/0356210 A1* | 11/2020 | Stone | G06F 3/0418 |

OTHER PUBLICATIONS

Corresponding International Patent Application No. PCT/GB2021/000009, International Search Report and Written Opinion dated May 6, 2021, 10 pages.

* cited by examiner

CLASSIFYING PRESSURE INPUTS

CROSS REFERENCE TO RELATED APPLICATIONS

This application is a continuation of International Patent Application number PCT/GB2021/000009, filed on 3 Feb. 2021, which claims priority from United Kingdom Patent Application number 20 01 544.2, filed on 4 Feb. 2020. The whole contents of International Patent Application number PCT/GB2021/000009 and United Kingdom Patent Application number 20 01 544.2 are incorporated herein by reference.

BACKGROUND OF THE INVENTION

The present invention relates to a method of classifying pressure inputs in a sensing array and an apparatus for performing a method of this type.

Force sensing touch screens are becoming increasingly frequent in their use in electronic devices such as mobile telephones, tablet computers or similar in both personal and professional capacities. Typically, these types of electronic devices and touch screens comprise sensing arrays comprising a plurality of sensing elements.

In some situations, such as those whereby a user is performing a gesture on the sensing array with an input device such as a stylus, it is not uncommon for the user to provide additional pressure inputs to a different part of the sensing array to those created from the pressure applied by the stylus. In particular, a user may create an additional pressure input from the palm of their hand, while simultaneously creating a pressure input from the stylus. The palm input is undesirable as it can lead to activations in the sensing array which do not correspond to the instructions the user wishes to provide. Specifically, the additional pressure inputs can provide errors in pressure calculations and distort the desirable inputs from the stylus, leaving the user with undesirable or unrequested outputs.

BRIEF SUMMARY OF THE INVENTION

According to a first aspect of the present invention, there is provided a method of classifying pressure inputs in a sensing array.

According to a second aspect of the present invention, there is provided an apparatus for classifying pressure inputs.

Optional features of the invention are defined in the dependent claims.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

Figure 1:
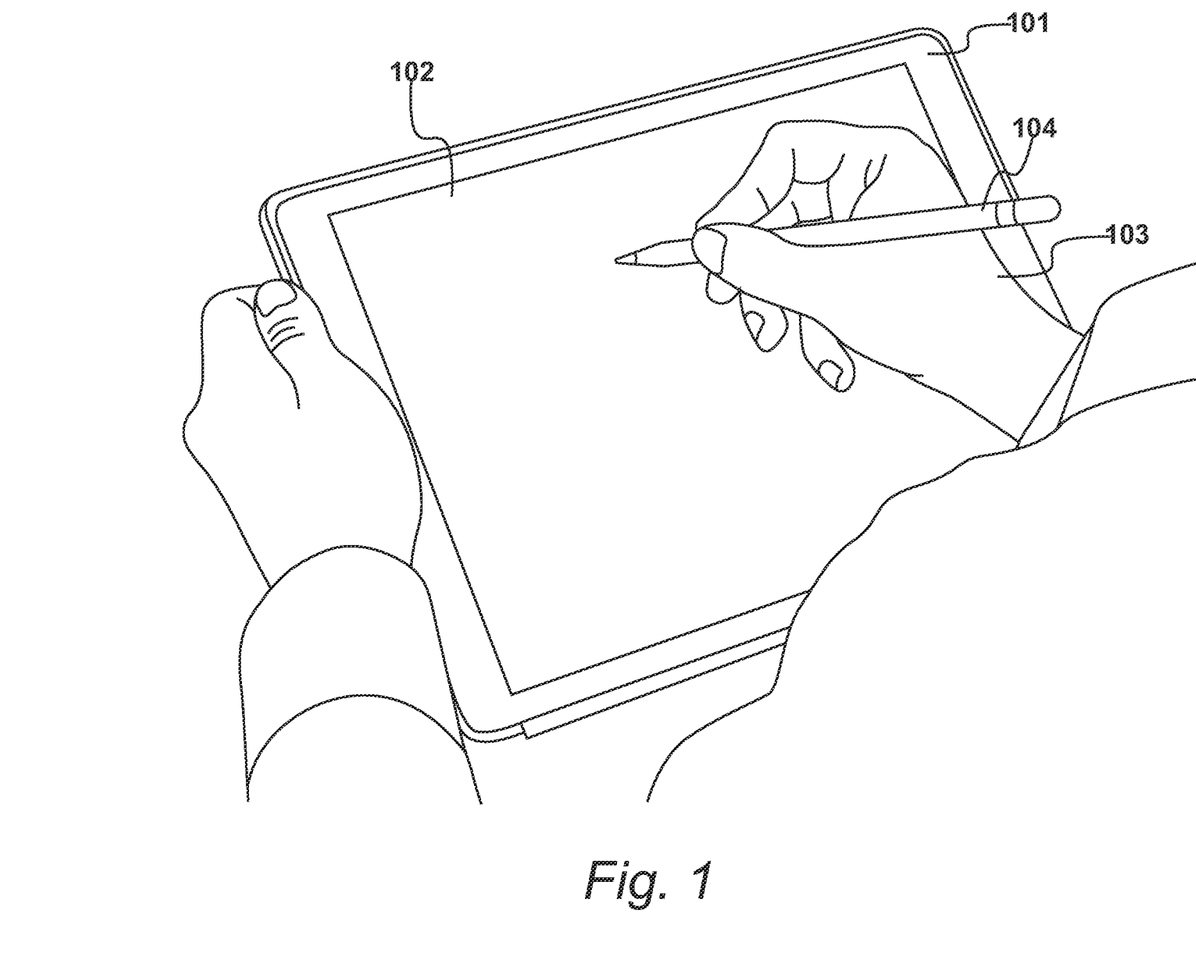
FIG. 1 shows an electronic device configured to classify pressure inputs in accordance with the present invention.

FIG. 1

An apparatus for classifying pressure inputs in accordance with the present invention can be utilized by means of an electronic device, such as electronic device 101 which is illustrated in the form of a tablet computer. Electronic device 101 comprises a touch screen 102 which is responsive to an applied force or an applied pressure. Thus, user 103, by use of an input device, in the form of stylus 104, provides a pressure input onto touch screen 102 enabling an appropriate output onto touch screen 102 to be provided.

In use, user 103 may provide various forms of pressure inputs from stylus 104. This is often in the form of a gesture or swipe and may include inputs such as a pattern taking the form of a handwritten word, constructed from a continuous gesture of stylus 104 by user 103. In further embodiments, pressure inputs may be provided in the form of swipes, gestures and/or shapes or other suitable forms creatable by appropriate input devices. It is appreciated that alternative input devices to a stylus may also be utilized in accordance with the present invention, such as a user's finger or a stylus which is not pen shaped in the manner shown.

When creating a pressure input from input device 104, user 103 may provide an undesirable pressure input from their hand 105 and in particular their palm as they rest part of their hand on electronic device 101 while writing or gesturing with stylus 104. Thus, electronic device 101, and consequently touch screen 102, may receive pressure inputs which comprise not only the desired pressure input from input device 104, but an undesirable input from user 103.

Figure 2:
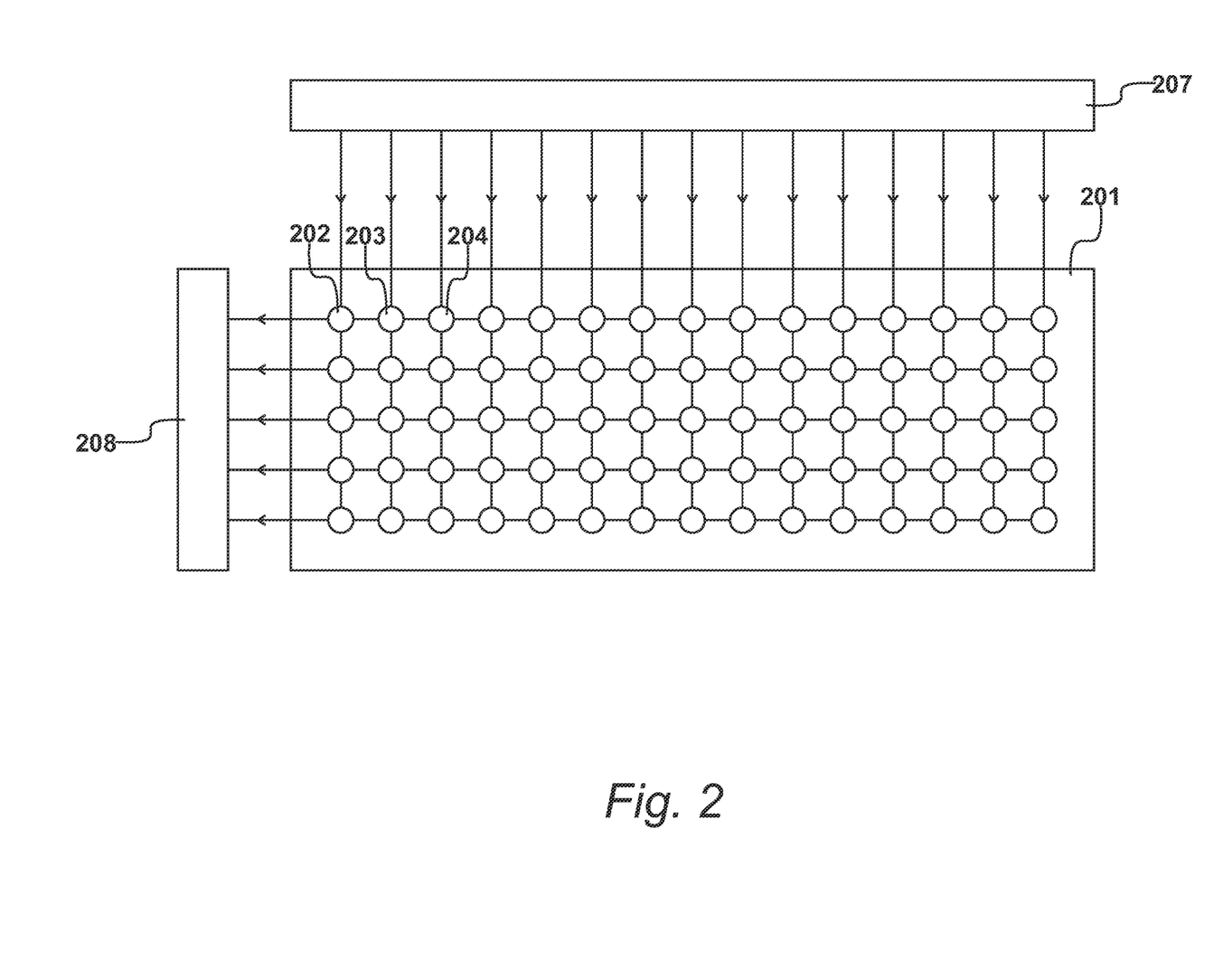
FIG. 2 shows a sensing array of an electronic device which provides a response to an applied force or pressure.

FIG. 2

In the embodiment described with reference to FIG. 1, electronic device 101 comprises a sensing array 201 which provides a response to an applied force or applied pressure.

Sensing array 201 comprises a plurality of sensing elements such as 202, 203 and 204. In the embodiment, each sensing element comprises a pressure sensitive material which is responsive to an applied pressure. The pressure sensitive material may be of the type supplied by the applicant Peratech Holdco Limited under the trade mark QTC®, which comprises a material which exhibits a reduction in electrical resistance following the application of a force or pressure. In this way, the sensing array can be configured to provide both two-dimensional positional data and an extent property in response to an applied pressure.

In this illustrated example, sensing array 201 comprises fifteen columns 205 and five rows 206. In a further example embodiment, sensing array 201 comprises fifty columns and twenty-four rows. It is further appreciated that alternative arrangements fall within the scope of invention and that any other suitable number of rows and columns may be utilized. Furthermore, while the illustrated example describes a square array, it is appreciated that other alternative array forms may be utilized, for example, a hexagonal array or similar. However, in all embodiments, the sensing array comprises a plurality of sensing elements that are arranged and which are responsive to an application of force or pressure.

A column connector 207 receives driving voltages from a processor and a row connector 208 supplies scan voltages to the processor. Without the application of force or pressure, all of the sensing elements within sensing array 201 remain non-conductive. However, when sufficient pressure is applied to the sensing array in proximity to at least one of the sensing elements, that sensing element becomes conductive, thereby providing a response between an input driving line and an output scanned line. In this way, when user 103 moves input device 104 across touch screen 102 and consequently sensing array 201, a number of the sensing elements may become conductive or active in line with the gesture made with input device 104 as will be illustrated further with respect to FIG. 4.

Figure 3:
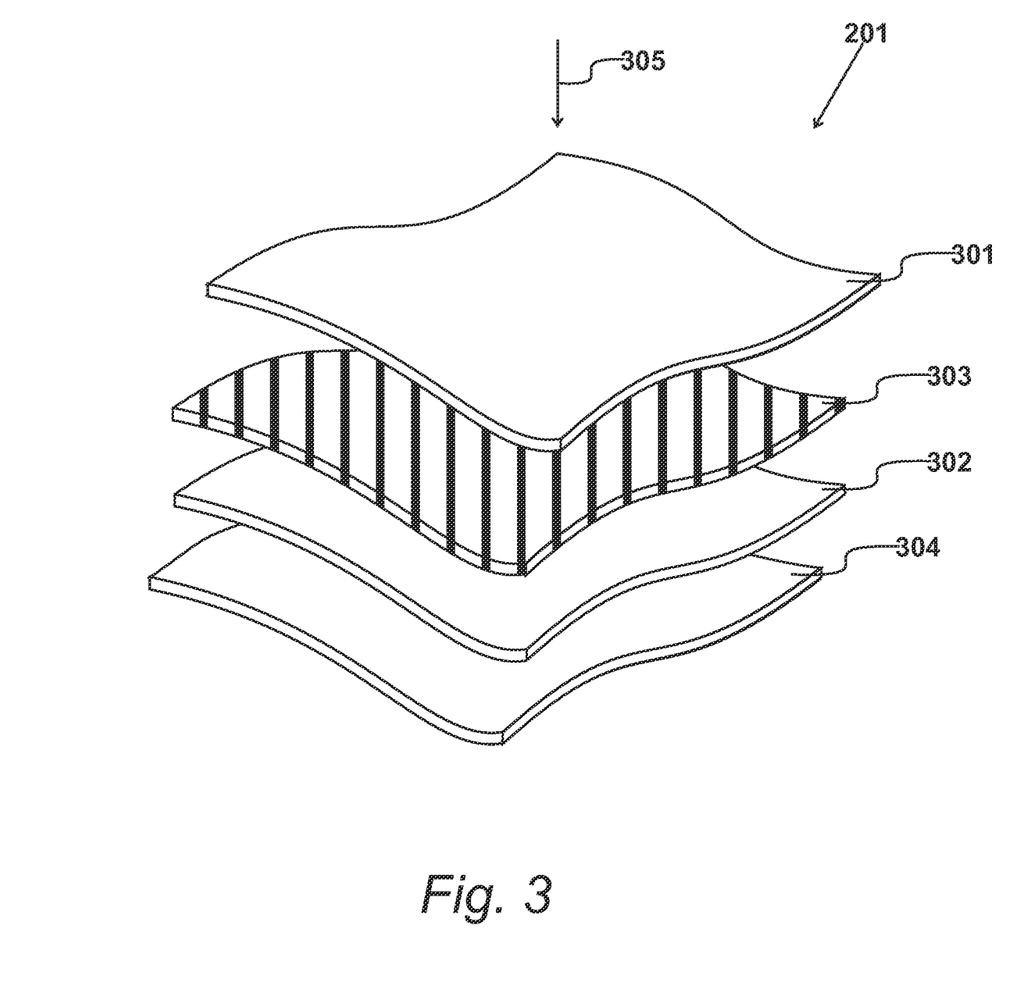
FIG. 3 shows a schematic exploded view of the sensing array of FIG. 2.

FIG. 3

A schematic exploded example embodiment of the construction of sensing array 201 is shown in FIG. 3. Sensing array 201 comprises a first conductive layer 301 and a second conductive layer 302. A pressure sensitive layer 303 is positioned between conductive layer 301 and conductive layer 302.

In the embodiment, the first conductive layer 301, second conductive layer 302 and pressure sensitive layer 303 are sequentially printed as inks onto a substrate 304 to form sensing array 301. First conductive layers 301 and 302 may comprise a carbon-based material and/or a silver-based material and pressure sensitive layer comprises a pressure sensitive material such as the type supplied by the applicant Peratech Holdco Limited under the trade mark QTC® as indicated previously. The pressure sensitive material therefore may comprise a quantum tunnelling composite material which is configured to exhibit a change in electrical resistance based on a change in applied force. The quantum tunnelling composite material also may be supplied as a printable ink or film.

Each layer can be printed to form the pattern of the sensing array 201 as shown in the plan view of FIG. 2. In the embodiment, first conductive layer 301 comprises a plurality of conductive traces which form a plurality of rows across the array in a first direction. In contrast, second conductive layer 302 comprises a further plurality of conductive traces which form a plurality of columns across the array in a second direction. In the embodiment, the first and second directions are orientated at ninety degrees (90°) to each other.

Pressure sensitive layer 303 is printed to provide a plurality of sensing elements which are formed at the intersection of the rows and columns of the first and second conductive layers. Thus, the sensing elements and pressure sensitive layer in combination with the conductive layers can provide an extent property or intensity of a force applied, such as a force in the direction of arrow 305, in a conventional manner by interpretation of the electrical outputs. Thus, when user 103 provides a pressure input onto touch screen 102, sensing array 201 provides an indicator of force magnitude applied along with positional properties indicating the position of the applied force.

FIGS. 1 to 3 describe an example electronic device and sensing array arrangement which is suitable for the present invention, however, it is acknowledged that alternative electronic devices, touch screens and sensing arrays which are capable of providing both positional and extent property outputs may also be used in accordance with the present invention herein.

Figure 4:
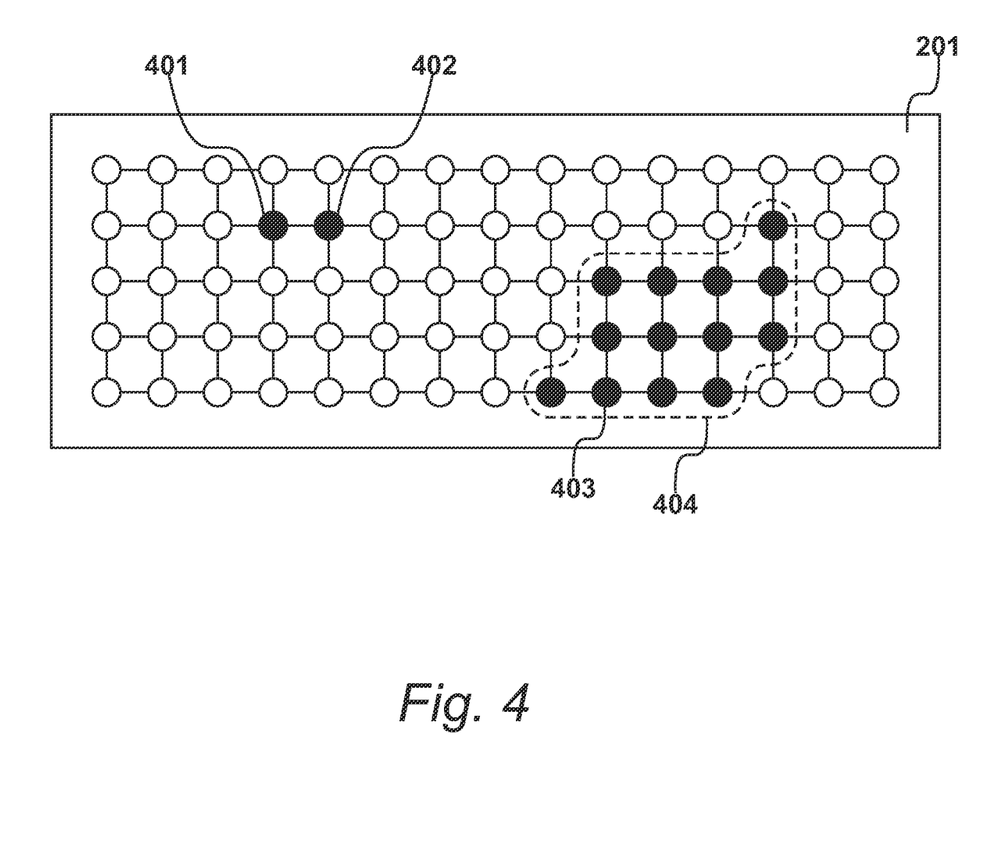
FIG. 4 shows the sensing array of FIG. 2 having received a pressure input including a desirable input and an undesirable input.

FIG. 4

Sensing array 201 is shown in FIG. 4 having received a pressure input from user 103 in the manner of the application shown in FIG. 1. In response to the pressure input provided by user 103, a plurality of sensing elements has been activated, as highlighted in FIG. 4.

In the illustrated embodiment, sensing elements 401 and 402 have been activated in response to a pressure applied to touch screen 102 by stylus 104, representing desired inputs. In addition, a further plurality of sensing elements 403 in sensing array 201 have also been activated, which have been activated due to the pressure applied by user 103 by means of their palm. This therefore represents an undesirable pressure input 404. As a result, when a user provides desirable inputs 401, 402 in combination with undesirable pressure inputs, such as 404, the undesirable input can adversely affect the calculations made in respect of the desirable input. For example, when an applied force is calculated by means of sensing array 201 in the manner described in FIG. 3, the undesirable pressure input can distort the desired input and output a pressure reading inconsistent with the pressure applied from input device 104. Thus, a user may find that outputs are inaccurate, or alternatively find that they have accidently activated another program or application that they had not intended to. In the embodiment, the plurality of pressure inputs is identified on a frame-by-frame basis.

Thus, once sensing array 201 has identified the pressure inputs, both desirable and undesirable, in the sensing array, the pressure inputs are converted into an output image which will be described further in respect of FIGS. 5 to 7.

Figure 5:
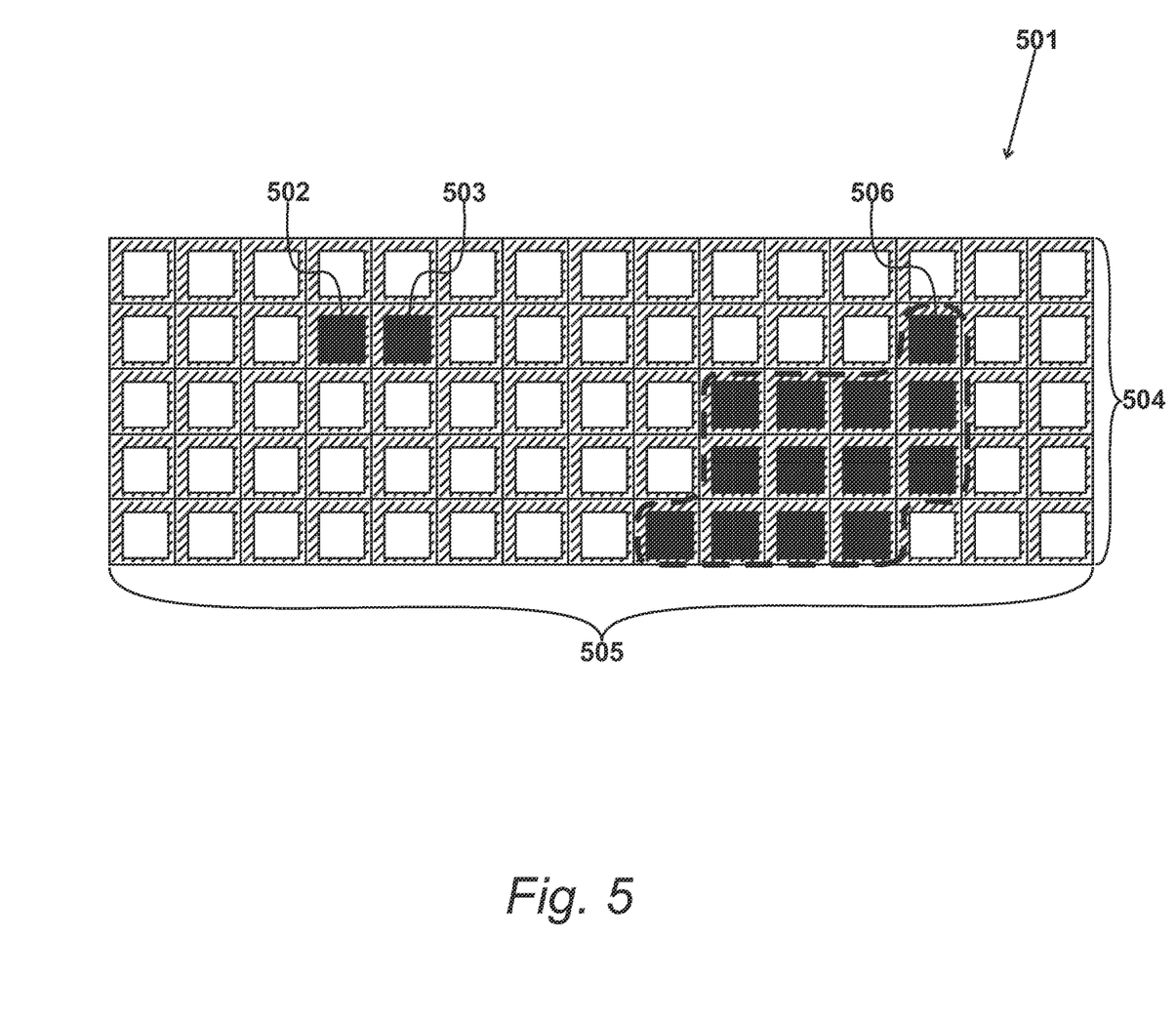
FIG. 5 shows a pixel array corresponding to the sensing array.

FIG. 5

A corresponding pixel array 501 which corresponds to sensing array 201 is shown in FIG. 5. Pixel array 501 comprises a plurality of pixels which corresponds with an equivalent sensing element of the sensing array 201. Thus, sensing element 401 corresponds with pixel 502 and sensing element 402 corresponds with pixel 503.

In the embodiment, the pixels of pixel array 501 are arranged as a first plurality of pixels arranged in rows 504, and a second plurality of pixels arranged in columns 505. In this illustrated example corresponding to previously described sensing array 201, pixel array 501 comprises fifteen columns and five rows. In a further example embodiment, pixel array 501 comprises fifty columns and twenty-four rows in line with the similar embodiment of the sensing array. It is further appreciated that alternative arrangements fall within the scope of invention and that any other suitable number of rows and columns may be utilized. The arrangement, however, would be substantially similar to that of the sensing array 201.

Each pixel in pixel array 501 is configured to provide an output image. In the embodiment, the image may be output in grayscale format in which the output is provided as either black or white.

Thus, in this embodiment, pixels 502 and 503 are provided an output which corresponds to a desirable input, while the plurality of pixels 506 are provided with an output which corresponds to an undesirable input. This is identified by means of the output image of FIG. 6.

Figure 6:
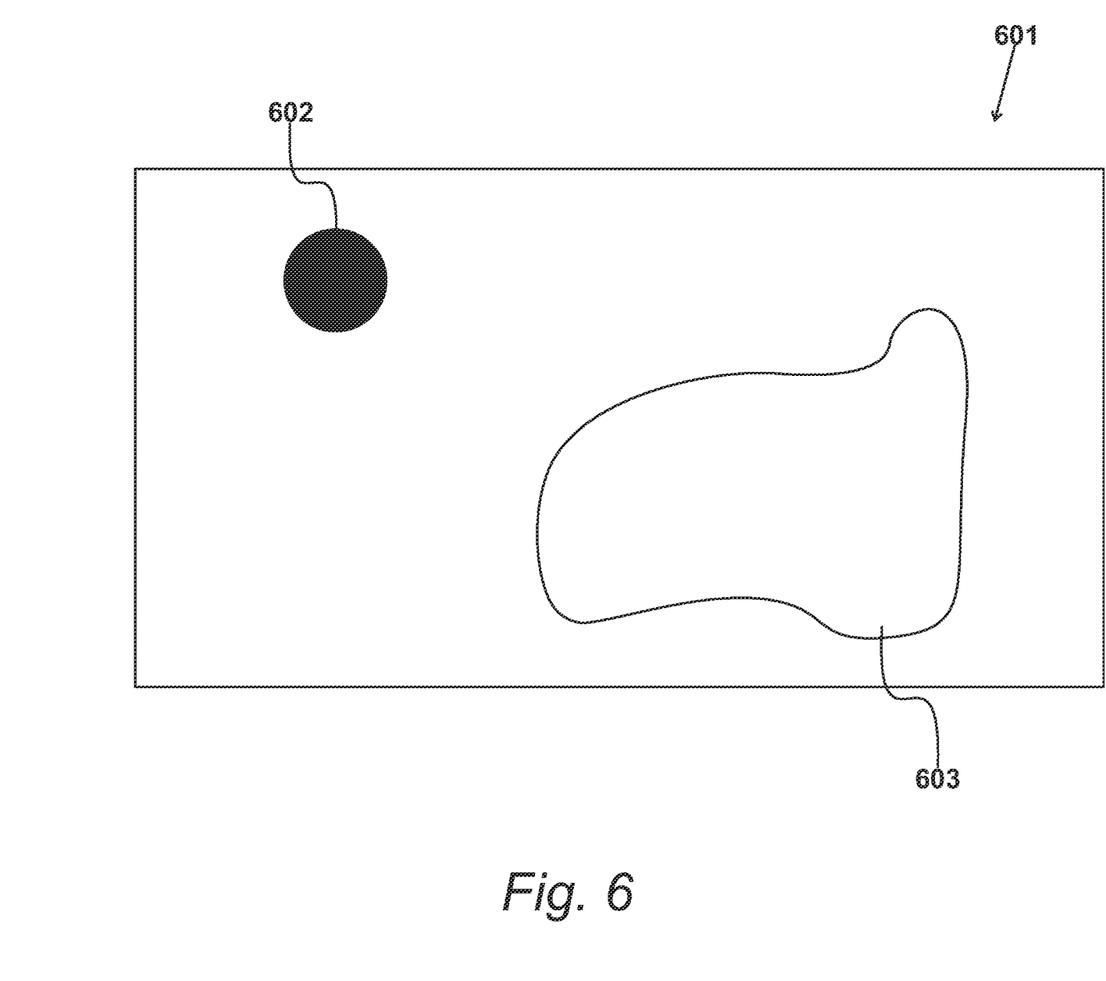
FIG. 6 shows an output image produced in response to a plurality of pressure inputs in the sensing array.

FIG. 6

Output image 601 derived from the pressure inputs into sensing array 201 is shown in FIG. 6. Output image 601 comprises desirable input 602 in image form and undesirable input 603 in image form. Thus, output image 601 has been converted from the plurality of pressure inputs identified by sensing array 201 by mapping each pressure input to a pixel of pixel array 501.

Output image 601 is provided in greyscale format in which a pressure input is defined as black or white. In the embodiment, by means of a predetermined threshold, pressure inputs are determined as being either high or low. High-pressure inputs can be defined in line with previously recorded pressure inputs consistent with palm or hand application, and low-pressure inputs can be defined in line with previously recorded pressure inputs consistent with desirable stylus inputs, which are typically lower in applied force that those resulting from a palm input. In the embodiment, high-pressure inputs are defined as white in terms of the output image and low-pressure inputs are defined as black in terms of the output image.

Thus, as can be seen from the example output image 601, the activated sensing elements which produce pressure input 404 correspond to undesirable input 603 which is identified as being a high-pressure input (above a predetermined palm threshold) and is colored white as a consequence. Similarly, activated sensing elements 401 and 402 have been identified as low-pressure inputs, as they lie within a predetermined range for stylus pressure inputs and consequently have been output as a desirable input 602 which is colored black.

This therefore ensures that desirable and undesirable inputs can be effectively identified and appropriate masks for undesirable inputs be applied at will be described with respect to FIG. 7.

Figure 7:
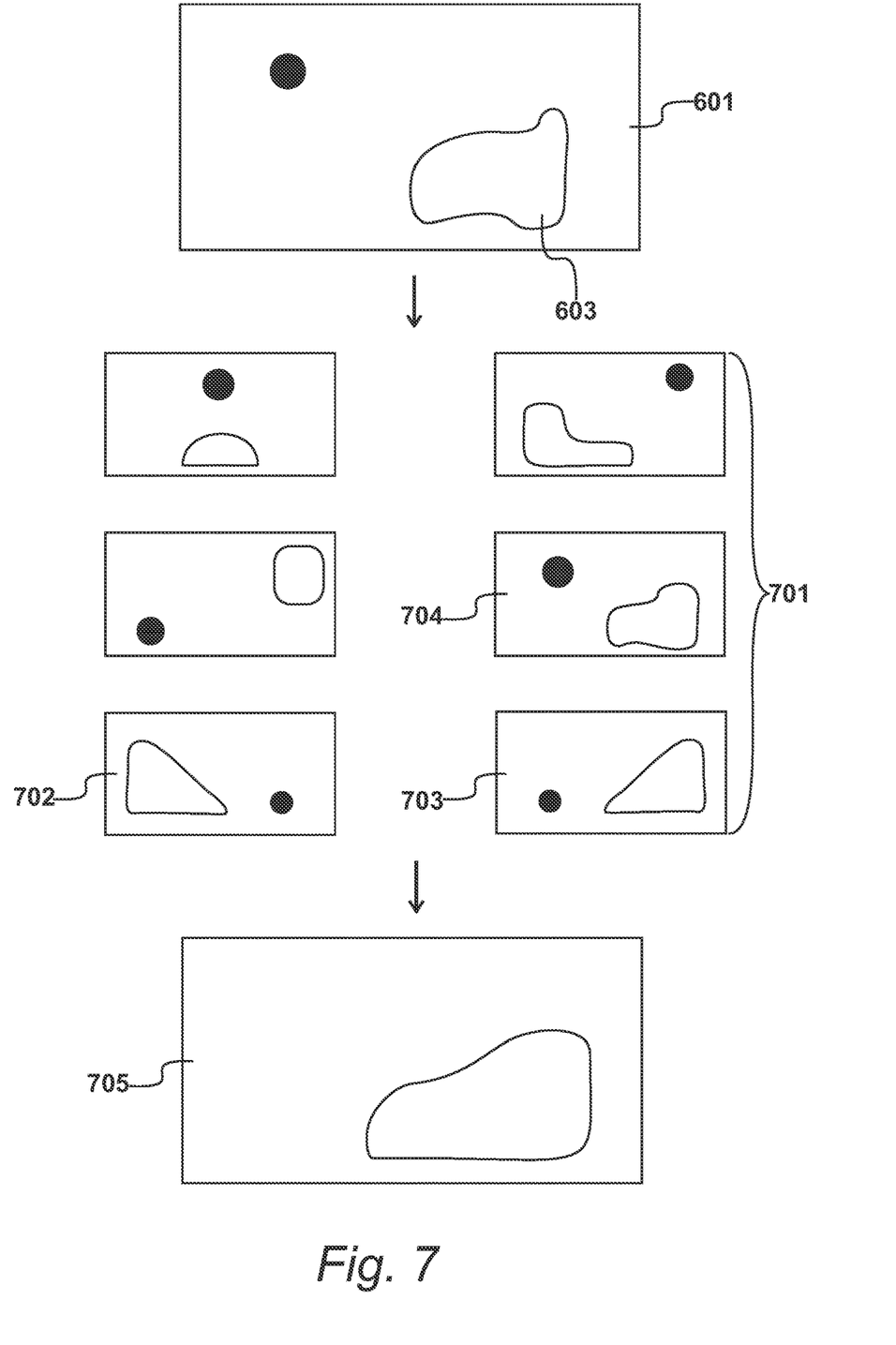
FIG. 7 shows a schematic illustrating the comparison of the output image with a data set and a selection of an appropriate mask for application.

FIG. 7

Output image 601 is processed by means of a processor in order that an appropriate mask can be identified to avoid the previously described problems with undesirable pressure inputs.

To achieve this, output image 601 is compared with a data set 701. Data set 701 comprises a plurality of images comprising undesirable pressure inputs. The data set of images has been previously created and provided to an artificial neural network (ANN). In an embodiment, the artificial neural network is a convolutional neural network (CNN).

In the embodiment, the artificial neural network is trained on the basis of the data set to identify white areas as undesirable inputs and black areas as desirable inputs. In this way, the artificial neural network is trained to identify undesirable pressure inputs.

In line with conventional ANNs, this is achieved by providing a large number of images in which desirable and undesirable pressure inputs are identified such that the ANN can distinguish between the images. Data set 701 is shown diagrammatically in FIG. 7 in a reduced form, showing only six such images, however, in practice, the number of images provided is much larger and may include hundreds or thousands of images of previously identified palm inputs. While it may be time consuming to create corresponding output images from actual inputs, data set 701 can be augmented by providing additional images that have been adjusted incrementally from actual input images. For example, data set 701 illustrates output image 702 and output image 703. Output image 703 is a flipped image of output image 702. This provides the ANN with two images for the data set from a single actual input. Thus, in this way, images can be adjusted to augment the data set. This illustrated example identifies adjustment of the image occurring from flipping the image, however it is appreciated that this may also be achieved by rotating an actual image, scaling the image or otherwise altering the image to augment the data set.

Thus, the artificial neural network compares output image 601 with data set 701 and identifies image 704 as being similar to output image 601. Each image in data set 701 has an associated mask which corresponds to it. In this way, once the artificial neural network has identified a corresponding image, the associated mask can be identified and applied to output image 601.

Masks which are associated with each image in data set 701 are created by identifying the undesirable pressure images in the data set and providing them in a similar greyscale format of black and white. Masks can be extended as necessary by tailoring the kernel size of the artificial neural network so as to increase the border of the areas detected as undesirable. This can avoid undesirable pressure inputs falling outside the boundary of the mask during removal.

A suitable mask is created for each image of the data set. The mask is a further image of a single channel which, in the embodiment, comprises a bit depth of one bit (black or white). Each mask is created manually with undesirable inputs identified by an operative and highlighted as a one or a zero, corresponding respectively to black or white.

Mask 705 represents a mask associated with image 704. Having compared output image 601 with data set 701 and identified similarity with image 704, mask 705 can be applied so as to remove undesirable pressure inputs corresponding to the undesirable pressure input 603 in output image 601. In this way, any pressure input received underneath the mask can be removed from the output from the sensing array so that the reading from the desirable input can be emphasized and more accurately interpreted without false readings.

Figure 8:
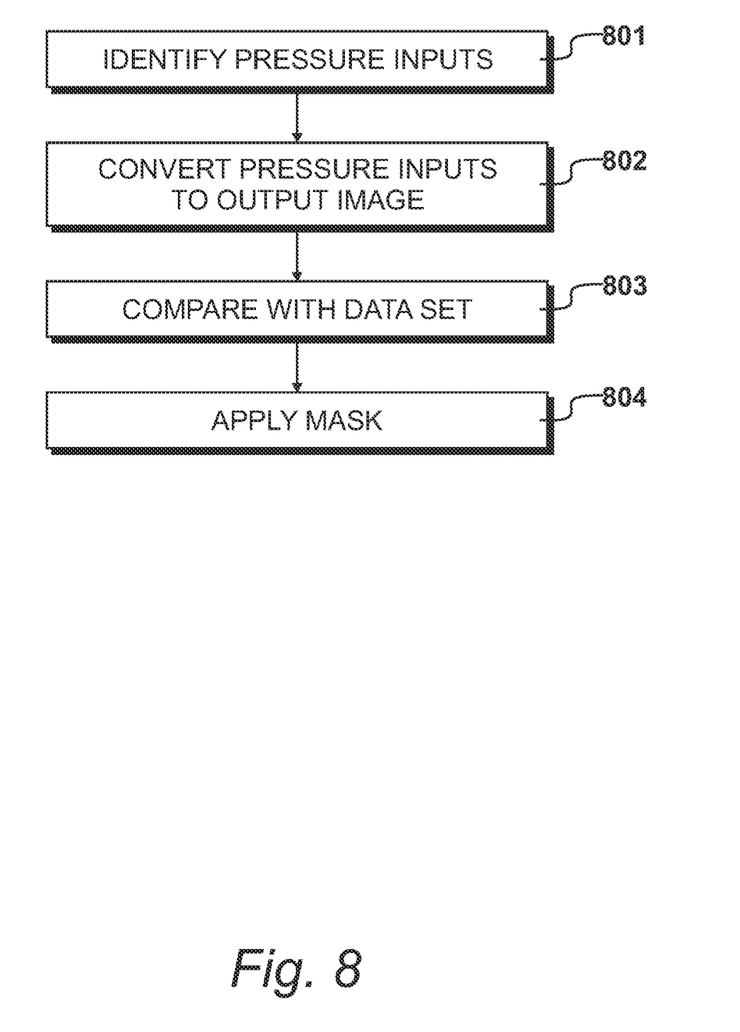
FIG. 8 shows the method of classifying pressure inputs in order to apply a mask to avoid the influence of undesirable inputs.

FIG. 8

A method of classifying pressure inputs in a sensing array as described herein in shown schematically in FIG. 8. At step 801 the plurality of pressure inputs, including both desirable and undesirable pressure inputs are identified.

At step 802, the plurality of pressure inputs is converted into an appropriate output image, such as output image 601 as previously described. Once an output image has been created, the output image is compared with a data set, such as data set 701. The data set comprises a plurality of images comprising undesirable pressure inputs and, at step 803, an artificial neural network compares the data set with the previously identified output image.

As each data set image includes an associated mask, the mask can then be applied to remove the undesirable pressure input created. By tailoring the kernel size in the artificial neural network, it can be ensured that all undesirable inputs are effectively removed from the output, so that they cannot interfere with the desirable inputs when providing an output to a user.

The classification process described herein is described by way of example, and, it is appreciated that alternative sensing arrays, touch screens and electronic devices can be utilized to provide similar pressure inputs and outputs in accordance with the invention. Furthermore, undesirable inputs are described herein as arising from a user's palm, however, it is further appreciated that, in other applications, undesirable inputs can be created by other means, such as from other inputs that are not required to activate the touch screens in the manner required. It is therefore appreciated that alternative functionally similar embodiments fall within the scope of the application and invention.

Figure 9:
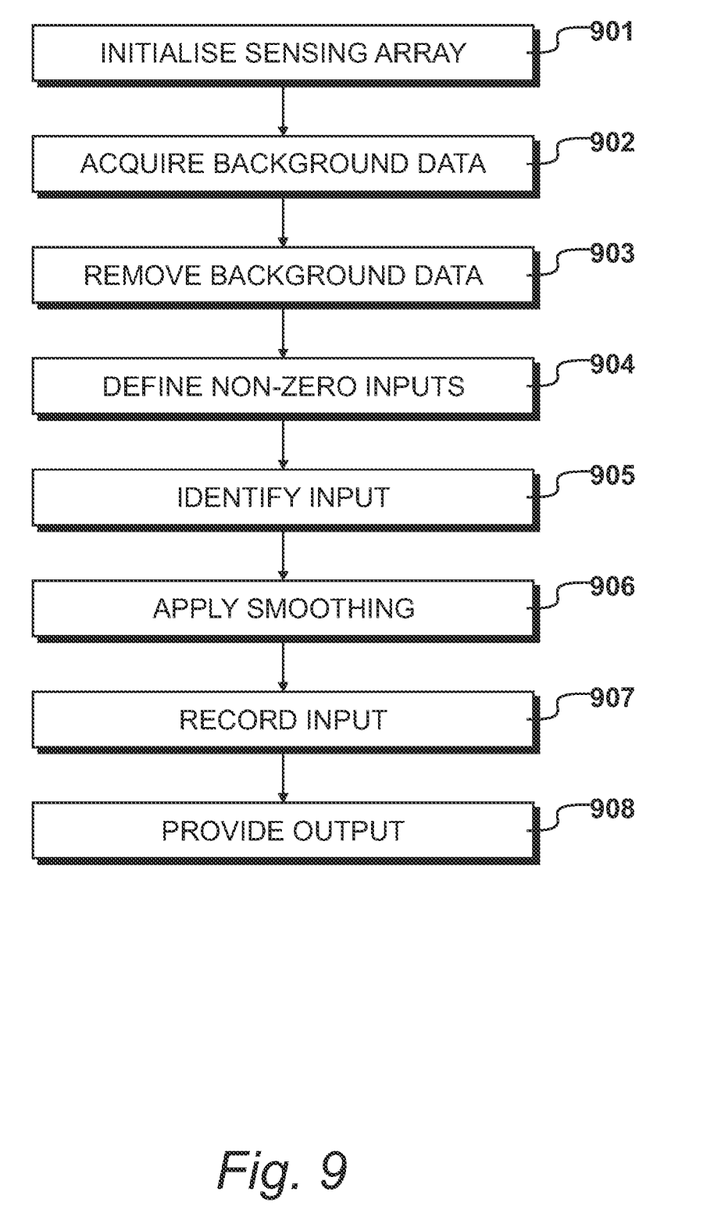
FIG. 9 shows a process in which the method of the claimed invention can be incorporated into a method of tracking and visualizing an input in a sensing array.

FIG. 9

The method of classifying pressure inputs previously described can be incorporated as part of a process can be utilized in multi-input force sensing. FIG. 9 shows a process in which the method of the claimed invention can be incorporated into a method of tracking and visualizing an input in a sensing array.

At step 901, a sensing array, such as sensing array 201, is initialized. Any algorithm required to ensure a smooth predictive output onto an electronic device or touch screen is loaded so that the touch screen is ready to respond to any contact made by a user. Properties of the sensing array may be provided to a processor to ensure that any outputs are compatible with the sensing array itself.

In accordance with the invention described herein, a palm rejection model is also be loaded to ensure that readings accidently made by a user's palm can be effectively rejected and not mistaken for genuine inputs.

At step 902, data is gathered from the sensing array to ascertain any background levels which need to be filtered from the input. The data gathering process extracts raw data from the sensor including stray activations, sensor noise and any desired signals. Any stray activations and/or sensor noise, including palm readings, must be filtered out prior to the determination of the location of a genuine touch input so as to avoid a reading which is prone to significant noise.

During this step, in an embodiment, a low-pass convolutional filter is applied to the gathered data to smooth out any noisy background activations. For a first acquisition, or when there is currently no input from a user's finger or stylus, a background reading can be stored, updating any previous background reading data previously stored into the system. Any background reading can then be removed from the current data, as per step 903, along with any data above a threshold for undesirable data inputs, such as a palm described previously.

Co-ordinates for any non-zero inputs are defined at step 904. This provides an isolated signal, free from the background data and undesirable inputs previously removed at step 903. Any data identified here is considered a desirable input forming part of the input path intended by a user. At step 905, the type of input is identified. This can be a new pressure input, a current pressure input (such as a continuation of a pressure input path), a predicted input (based on previous input data) or no input.

Once the pressure input has been identified, smoothing can be applied at step 906. A weighting can be provided to the current data point to provide an output which is robust to the noise in the system. Any smoothing applied remains undistorted given that previously identified undesirable inputs have been removed from the outputs to provide a clean desirable output reading.

At step 907, the pressure input path recorded to the system and at step 908 an output visualization is provided for a user. Prior to the output, in order to provide a more suitable visual to a user, Bezier smoothing can be applied to increase the apparent resolution to improve the appearance of the output to a user. In an example where the output is representative of a user's handwriting, created by stylus 104 for example, the appearance gives a more natural look to the handwriting image. Bezier smoothing can be particularly advantageous as it can include a continuous approach in which historic data is reviewed and updated as the pressure input path is still being completed. This enables fine adjustments to be made which can be particularly appealing in the case where the pressure input is output in the form of handwriting script.

Once an output has been provided, the process may be repeated by returning to step 902 to provide continuous outputs for a user.

The invention claimed is:

1. A method of classifying pressure inputs in a sensing array, said sensing array comprising a plurality of sensing elements responsive to pressure inputs, said method comprising the steps of:
   identifying a plurality of pressure inputs in said sensing array;
   converting said plurality of pressure inputs into an output image;
   comparing said output image with a data set comprising a plurality of images comprising undesirable pressure inputs by means of an artificial neural network, each said image including an associated mask; and
   applying one said associated mask consistent with said output image in response to said comparing step to remove undesirable pressure inputs; wherein
   said step of converting said plurality of pressure inputs into an output image comprises mapping each said pressure input to a pixel of a pixel array, said pixel array corresponding to said sensing array.

2. The method of claim 1, further comprising the step of: producing said images in a greyscale format.

3. The method of claim 2, wherein pressure inputs are defined as high or low and further wherein high-pressure inputs are designated as white and low-pressure inputs are designated as black.

4. The method of claim 1, further comprising the step of: creating said data set comprising a plurality of images comprising undesirable pressure inputs.

5. The method of claim 4, wherein said step of creating said data set comprises augmenting said data set by adjusting each said image.

6. The method of claim 5, wherein said step of adjusting each said image comprises at least one of the following: rotating said image; flipping said image; scaling said image.

7. The method of claim 4, further comprising the step of: training said artificial neural network through said data set to identify undesirable pressure inputs.

8. The method of claim 1, further comprising the step of: extending said associated mask by tailoring a kernel size of said artificial neural network.

9. The method of claim 1, further comprising the step of: creating said associated mask by identifying undesirable pressure inputs from said plurality of images in said data set.

10. The method of claim 1, wherein said step of identifying a plurality of pressure inputs is conducted on a frame-by-frame basis.

11. The method of claim 1, wherein said artificial neural network is a convolutional neural network.

12. An apparatus for classifying pressure inputs, comprising:
    a sensing array comprising a plurality of sensing elements responsive to pressure inputs, a pixel array corresponding to said sensing array, and a processor, said processor being configured to:
    identify a plurality of pressure inputs in said sensing array;

convert said plurality of pressure inputs into an output image by mapping each said pressure input to a pixel of said pixel array;

compare said output image with a data set comprising a plurality of images comprising undesirable pressure inputs by means of an artificial neural network, each said image including an associated mask; and apply one said associated mask consistent with said output image in response to comparing said output image to remove undesirable pressure inputs.

13. The apparatus of claim 12, wherein said sensing array is configured to provide two-dimensional positional data and an extent property in response to an applied pressure.

14. The apparatus of claim 12, wherein said associated mask has a bit depth of one bit.

15. The apparatus of claim 12, wherein said images are produced in a greyscale format.

16. A touch screen comprising the apparatus of claim 12.

17. An electronic device comprising the touch screen of claim 16.

* * * * *